United States Patent Office 2,805,214
Patented Sept. 3, 1957

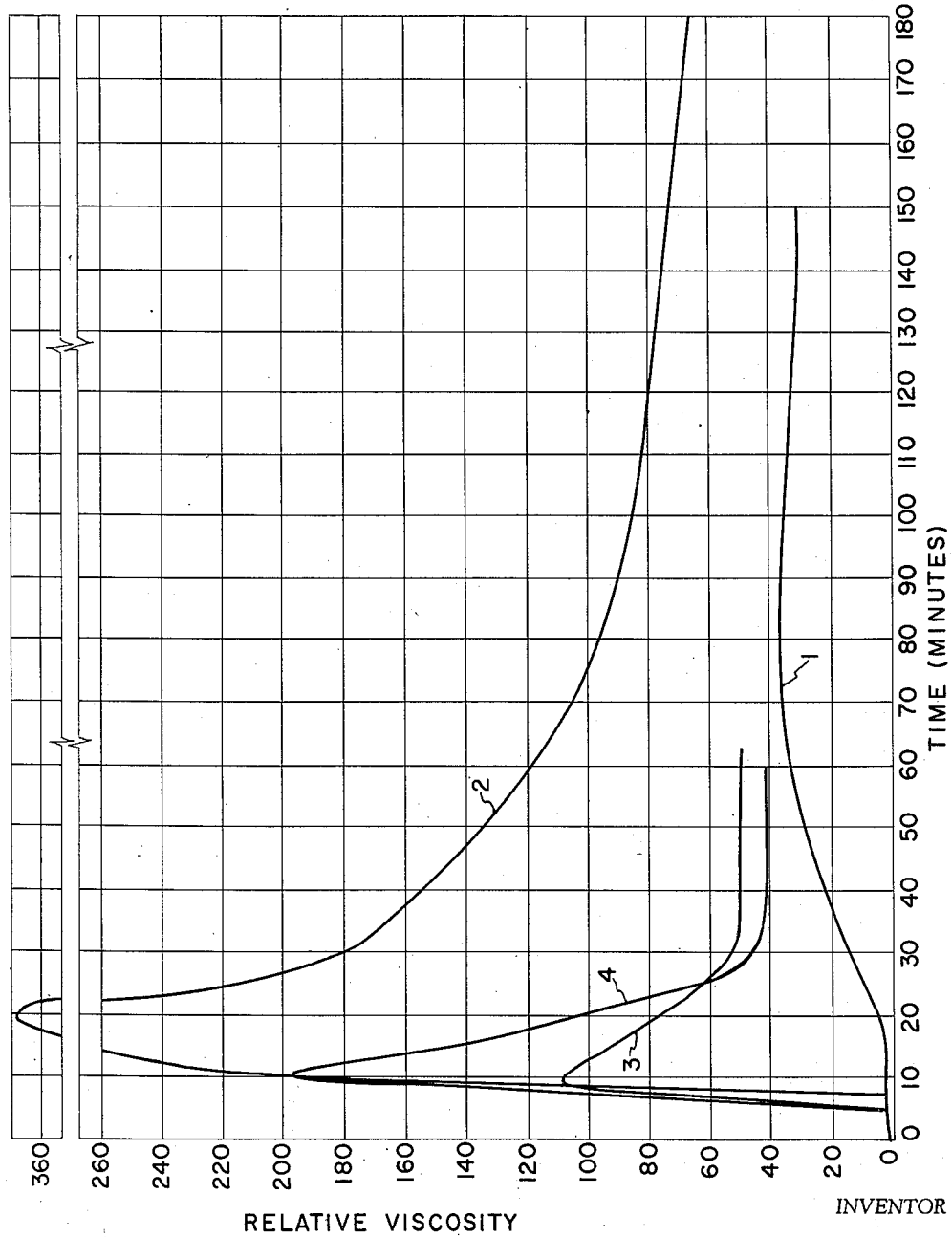

2,805,214

POLYMERIZATION OF LACTAM WITH MIXED CATALYST

Joseph Zimmerman, Wilmington, Del., assignor to E. I. du Pont de Nemours and Company, Wilmington, Del., a corporation of Delaware Application May 27, 1955, Serial No. 511,617

8 Claims. (Cl. 260—78)

This invention relates to polymerization of cyclic amides, particularly in preparation of fiber-forming polyamides.

A known method of preparing polyamides of high molecular weight from monomeric cyclic amides, such as lactams of medium- or long-chain aminocarboxylic acids, involves treatment of the molten monomer with catalysts, initiators, or promoters; hence, application of the general term "catalytic" to such mode of preparation. Prominent among recognized catalytic materials are the alkali metals and compounds containing them, which have proved especially useful in lowering the time of reaction to equilibrium (at which remain some water-extractable substances of low molecular weight, such as monomer, dimer, and trimer); however, their use customarily has produced an initial condition of extremely high viscosity, which hinders flow of the reaction mixture, thus necessitating batch-wise operation rather than a more desirable continuous or flow procedure.

A primary object of the present invention is elimination of excessive initial viscosity in polymerization of cyclic amides. A specific object is continuous polymerization of epsilon-caprolactam to polyamide of fiber-forming viscosity. Other objects of this invention, together with methods for attaing the various objects, will be apparent from the following description and the accompanying diagram, which represents graphically the relationship of viscosity versus time for polymerization of epsilon-caprolactam in the presence of various substances.

In general, the objects of the present invention are accomplished by addition of both an alkali-metal hydroxide and an alkali metal or alkali-metal amide or hydride to the cyclic amide to be polymerized; for convenience herein, these added materials are lumped together in the term "mixed catalyst," which is not intended, however, to indicate their relative physical relationship or state of distribution or to signify the effect of either of them upon the polylmerizable material except as suggested elsewhere in this description. The invention comprehends particularly heating of a lactam of a primary aminocarboxylic acid having at least five aliphatic carbon atoms between amine and carboxyl groups to a temperature below that at which the lactam boils (or decomposes) in an inert atmosphere and in the presence of small amounts of alkali-metal hydroxide and of alkali metal or alkali-metal amide or hydride, whereby polymerization occurs accompanied by a continuous rise in viscosity with time to a value suitable for formation of fibers; the heating temperature should exceed the melting point of the resultant polymer to ensure a satisfactory reaction rate.

As is well known, presence of water to the extent of more than several tenths mol percent based upon the lactam is detrimental to this type of catalytic polymerization, and it will be understood that care is taken in the practice of this invention not to exceed such concentration of water. The invention is exemplified below in some detail, with epsilon-caprolactam as the illustrative polymerizable cyclic amide because of its ready availability and the recognized fiber-forming characteristics of the resultant polyamide; parts are based upon molecular weights unless otherwise indicated, and "relative viscosity" mentioned in the examples is the ratio of flow time in a standard capillary at 25° C. of an 8.5% solution of the polymer in 90% formic acid relative to the rate for formic acid itself.

EXAMPLE I

An amount of 100 parts epsilon-caprolactam (recrystallized from cyclohexane) is heated under nitrogen at atmospheric pressure with 1.0 part lithium hydride and 0.7 part sodium hydroxide in a vessel jacketed at 218° C. From time to time the reaction mix is sampled to determine the viscosity. After an induction period of 19 minutes, the relative viscosity is noted to be 2.0; 11 minutes later the value is 15; and after a total heating time of 90 minutes, the relative viscosity is 32.9, and 9% by weight of the sample is water-extractable (at temperature of 100° C.). Continued heating for an additional 2½ hours reduces the relative viscosity to 26.7 and increases amine end-group concentration as a result of gradual degradation (i. e., decarboxylation) of the polymer. The water-extractable content remains essentially constant at 8% by weight. Fibers can be formed from this product, which is mainly polycaproamide, melting at about 215° C., by extrusion as is described by Greenewalt in Patent 2,217,743, and test fibers are easily hand-spun from the melt with a glass stirring rod; films can be produced successfully from it also.

The relation of relative viscosity to time for the material of the above example is represented by curve 1 in the graph; a smooth gradual rise in viscosity over the first 60 minutes or so is clearly apparent. When the above procedure was repeated with the sole exception of omitting the sodium hydroxide, the corresponding relationship was as shown by curve 2, which exhibits a value of about 360 for relative viscosity after only 20 minutes of heating, by which time the peak apparently had been passed; at 33 minutes the relative viscosity was 168, at 90 minutes, 90, and at 3 hours, 67; for considerable time on both sides of the peak the reaction mixture was deformable only with great difficulty. Upon repetition of the procedure omitting the lithium hydride but retaining the sodium hydroxide, no polymerization took place and the viscosity did not vary so long as the mix remained quiescent; in an identical sample run at 265° C. vigorous ebullition occurred, and the relative viscosity rose abruptly and passed through a peak as shown in curve 3, which is similar to that produced by the lithium hydride alone at the lower temperature (218° C.) but displaced generally toward the origin. At the higher temperature (265° C.), use of lithium hydride alone produced curve 4, which exhibits a peak intermediate to those of curves 2 and 3 but with an ultimate value of relative viscosity slightly lower than either and reached sooner than either, much sooner than in curve 2.

EXAMPLE II

The procedure of Example I is followed except that elemental sodium replaces the lithium hydride, and 2.0 parts of lithium hydroxide replace the 0.7 part sodium hydroxide. A relative viscosity of 2.0 is observed after an induction period of 25 minutes; 20 minutes later the value is 6; after a tottal heating time of 1¼ hours, the relative viscosity is 12.6, and no further increase occurs with increasing time. The lower ultimate viscosity value in this example than in the first is attributed to the higher concentration of alkali-metal hydroxide employed here.

EXAMPLE III

An amount of 100 parts epsilon-caprolactam (recrystallized from cyclohexane) is heated with 0.8 part lithium hydride and 0.4 part sodium hydroxide for over 200 minutes at 240° C. under nitrogen at atmospheric pressure. The following table indicates the relative viscosity at various times after the beginning; the amount of water-extractables remains essentially constant at 10% throughout.

Table

| Reaction time (minutes): | Relative viscosity |
|---|---|
| 10 | 31 |
| 20 | 28 |
| 30 | 28 |
| 90 | 24 |
| 202 | 22 |

The above table shows a rapid rise to a moderate value of relative viscosity followed by gradual diminution as a result of subsequent degradation. The peak associated with single catalysts is eliminated; consequently, this reaction can be carried out in a heating tube into which the lactam and the mixed catalyst are introduced and from which the product emerges continuously, through a spinneret if so desired. The time required for polymerization of lactams according to this invention is quite brief, being on the order of tens of minutes, much less than the hours required for non-catalytic polymerization; too, the handling difficulties associated with previous fast catalytic methods are eliminated.

EXAMPLE IV

An amount of 100 parts epsilon-caprolactam (recrystallized from cyclohexane) is heated with 0.8 parts sodium amide and 0.4 part sodium hydroxide for over 200 minutes at 240° C. under nitrogen at atmospheric pressure. As in the previous examples the viscosity rises rapidly to a moderate value without overshooting to an early viscosity peak.

The range of temperature suitable for the practice of this invention is determined primarily, as mentioned above, by the boiling point of the lactam and the melting point of the resultant polymer. In general, operation in the lower part of the range is conducive to more complete reaction, giving less water-extractable content and corresponding higher intrinsic viscosity at optimum reaction time. Of course, for any monomer tending to decompose below its boiling temperature, the operation should be carried out below the indicated decomposition temperature. Sufficient pressure should be imposed on the reaction mixture to maintain the reaction temperature well below any temperature at which ebullition occurs, or a viscosity peak will be evident even in the presence of alkali-metal hydroxide. For epsilon-caprolactam, the boiling temperature rises from 200° C., at a pressure equivalent to 110 millimeters mercury, to 262° C. at normal atmospheric pressure. In general, lactams of higher molecular weight will boil somewhat higher, and temperatures as high as 300° C. or somewhat more may be employed with various of them, also at superatmospheric pressure; seldom will it be practicable to attempt operation at less than 200° C. because of diminishing reaction rate at lower temperature. In the preparation of epsilon-caprolactam according to this invention a temperature of from about 215° C. to 265° C. is preferable.

The process of this invention is applicable generally to the polymerization of monomeric cyclic amides containing more than six annular carbon atoms, that is lactams of amino-carboxylic acids having at least five aliphatic carbon atoms between amine and carboxyl groups. Besides cyclohexanone isoxime (i. e., epsilon-caprolactam) to which the above description is directed for reasons there indicated, the following examples of suitable starting amides are suggested: methyl-cyclohexanone isoxime, cyclopetadecanone isoxime, and cyclohexadecanone isoxime. A customary way of producing these materials is treatment of the corresponding etoximes with sulfuric acid.

The mixed catalyst of this invention may be based upon any one or more of the alkali metals, of which the most readily available are lithium, sodium, and potassium; customarily the two components of the catalyst are not based upon the same alkali metal, although this may be done. The lower alkyls of these metals (e. g., methyl and isopropyl) occasionally may be employed in place of the elemental alkali metal or its amide or hydride. Occasionally, elemental alkaline-earth metals, such as calcium or barium, may prove similarly suitable; however, their substitution for the recommended materials is not advisable for the most successful practice of the present invention. Amounts on the order of hundredths of a mol percent for the recommended components of the mixed catalyst sometimes are satisfactory, and usually several tenths of each will prove sufficient; seldom need the ratio for either component exceed two mols per 100 mols of the starting lactam. Of course, more than one material may be used for each component, if desired; usually, however, only one will appear in each.

The products of this invention are characterized by high softening temperatures and by their suitability for extrusion into filaments that can be cold-drawn to highly tenacious condition, for which intrinsic viscosity of at least 0.4 is requisite. Similarly, films may be cast and subsequently stretched in one or more directions to form laminar structures of high tensile strength. These products are micro-crystalline, as evidenced by sharp melting points and characteristic X-ray patterns. Advantages and benefits in addition to those mentioned above will accrue to persons following the teaching of this invention.

The claimed invention:

1. In catalytic polymerization of lactams of amino-carboxylic acids having at least 5 aliphatic carbon atoms between the amine and carboxyl groups, the improvement comprising employing as a mixed catalyst added catalytic amounts of both an alkali-metal hydroxide and of a material from the class consisting of the alkali metals and their amides and hydrides, each of said added components being added in an amount more than about 0.1 mol percent based on the lactam, whereby the viscosity of the reaction mixture increases continuously with time to an equilibrium value without passing through an initial peak value.

2. The process improvement of claim 1 in which the constituents of the mixed catalyst are based upon different alkali metals.

3. Process comprising polymerizing a lactam of an aminocarboxylic acid having at least 5 aliphatic carbon atoms between the amine and carboxyl groups by maintaining the lactam molten and free from ebullition in the presence of added catalytic amounts of both an alkali-metal hydroxide and at least one material from the class consisting of alkali metal, alkali-metal amide, and alkali-metal hydride, each of said added components being added in an amount more than about 0.1 mol percent based on the lactam.

4. The process of claim 3 performed in continuous manner by continuously and simultaneously adding lactam and catalyst to the reaction zone while removing polymer therefrom.

5. Process comprising heating a lactam of a primary aminocarboxylic acid having at least 5 aliphatic carbon atoms betwen amine and carboxyl groups to a temperature below its boiling temperature in an inert atmosphere and in the presence of added catalytic amounts of both an alkali-metal hydroxide and a material from the class consisting of alkali metals, alkali-metal amides, and alkali-metal hydrides, each of said added components being added in an amount more than about 0.1 mol percent based on the lactam, whereby rapid polymerization occurs without being accompanied by an initial viscosity peak.

6. Process comprising treating a catalytically polymerizable lactam above its melting temperature and below the lesser of its boiling and decomposition temperatures with added catalytic amounts of both an alkali-metal hydroxide and a material from the class consisting of the alkali metals, alkali-metal amides, and alkali-metal hydrides, each of said added components being added in an amount more than about 0.1 mol percent based on the lactam, whereby the lactam forms a polyamide of high molecular weight.

7. The process of claim 1 in which each component of the mixed catalyst is utilized in an amount less than about two mol percent based on the lactam.

8. The process of claim 5 in which each component of the mixed catalyst is utilized in an amount less than about two mol percent based on the lactam.

References Cited in the file of this patent

FOREIGN PATENTS 906,889    France _____ June 4, 1945

OTHER REFERENCES

Ser. No. 309,376, Frederick et al. (A. P. C.), published Apr. 20, 1943.